(12) United States Patent
Kitchener et al.

(10) Patent No.: US 8,351,176 B2
(45) Date of Patent: Jan. 8, 2013

(54) INTRINSICALLY SAFE DSL CIRCUIT

(75) Inventors: Renato Kitchener, West Sussex (GB); Gunther Rogoll, Mannheim (DE); Michael Kessler, Mannheim (DE)

(73) Assignee: Pepperl + Fuchs GmbH (DE)

( * ) Notice: Subject to any disclaimer, the term of this patent is extended or adjusted under 35 U.S.C. 154(b) by 491 days.

(21) Appl. No.: 12/599,314

(22) PCT Filed: May 9, 2008

(86) PCT No.: PCT/GB2008/001631
§ 371 (c)(1),
(2), (4) Date: Nov. 9, 2009

(87) PCT Pub. No.: WO2008/139172
PCT Pub. Date: Nov. 20, 2008

(65) Prior Publication Data
US 2010/0303138 A1  Dec. 2, 2010

(30) Foreign Application Priority Data

May 11, 2007  (GB) .................................. 0709102.8

(51) Int. Cl.
*H02H 9/04* (2006.01)
(52) U.S. Cl. ......................................................... 361/119
(58) Field of Classification Search ................... 361/119
See application file for complete search history.

(56) References Cited

U.S. PATENT DOCUMENTS

| | | | |
|---|---|---|---|
| 6,023,399 A | 2/2000 | Kogure | |
| 6,691,257 B1 * | 2/2004 | Suffin | 714/43 |
| 7,512,688 B2 * | 3/2009 | Ogushi et al. | 709/227 |
| 2004/0117158 A1 | 6/2004 | Evans | |
| 2005/0220180 A1 * | 10/2005 | Barlev et al. | 375/222 |
| 2006/0209847 A1 * | 9/2006 | Binder | 370/400 |
| 2007/0110026 A1 * | 5/2007 | Sinha et al. | 370/351 |

FOREIGN PATENT DOCUMENTS

| | | | |
|---|---|---|---|
| WO | 2005031481 A2 | | 4/2005 |
| WO | 2005054966 A1 | | 6/2005 |
| WO | 2005086110 A2 | | 9/2005 |
| WO | WO 2006003445 A1 | * | 1/2006 |
| WO | 2006105743 A1 | | 10/2006 |

OTHER PUBLICATIONS

International Search Report, PCT/GB2008/001631.

* cited by examiner

*Primary Examiner* — Jared Fureman
*Assistant Examiner* — Scott Bauer
(74) *Attorney, Agent, or Firm* — Lerner, David, Littenberg, Krumholz & Mentlik, LLP

(57) ABSTRACT

An electrical installation comprising control and/or monitoring means connected to a field device by means of an electrical communications circuit, in which the communications circuit comprises a power supply, a communications device, the field device as a load thereof, and Intrinsic Safety means, in which the communications device is adapted to send and receive signals over the communications circuit to and from the field device, in which the field device is adapted to send and receive signals over the communications circuit to and from the communications device, in which the Intrinsic Safety means renders all or part of the communications circuit Intrinsically Safe, in which the field device is located in an Intrinsically Safe part of the communications circuit, characterized in which the communications circuit is adapted to carry DSL signals, and in which the communications device and the field device communicate with one another according to the DSL protocol.

14 Claims, 4 Drawing Sheets

INTRINSICALLY SAFE DSL CIRCUIT

CROSS REFERENCE TO RELATED APPLICATIONS

The present application is a national phase entry under 35 U.S.C. §371 of International Application No. PCT/GB2008/001631, filed May 9, 2008, published in English, which claims the benefit of Great Britain Patent Application No. 0709102.8, filed May 11, 2007. The disclosures of said applications are incorporated by reference herein.

This invention relates to an Intrinsically Safe communications circuit which uses the DSL protocol, for use particularly, but not exclusively in combustible atmospheres, and in particular gas group classification IIC, Hydrogen and Acetylene, and below, for example gas group IIB and IIA, for gas and/or dust.

Field instruments and equipment in an Intrinsically Safe environment are controlled remotely via an electrical communications circuit. Traditionally communications are provided in the same electrical circuit as the power to drive the field instruments.

Newer technologies, such as Ethernet, provide the possibility of having separate communications circuits bundled together with power circuits. This provides greater flexibility and communications speed, which allows for more modern and sophisticated equipment to be used in the field.

Ethernet was not designed for use in an Intrinsically Safe environment, however WO2007/088387 in the name of the applicant discloses an incendive arc prevention system for use with powered Ethernet cables, which allows for just such specialised usage. WO 2007/129031, also in the name of the applicant discloses a further invention which allows for Ethernet signals to be used in an Intrinsically Safe environment.

However, 100 Mb/s fast Ethernet has a limited cable span of approximately 100 metres. Any longer than this and signal attenuation is too high. For large scale process plants, the r.m.s (average) cable span can be as high as 500 metres. If Ethernet communications were used over such a distance it would require at least four repeaters, each of which would require approximately five watts of power. With a source voltage of 48V, the current consumption would be approximately 400 mA, purely for the switches and/or repeaters. And even if a structure of this type were used it would still not be ideal because over such distances Ethernet can be temperamental and unreliable due to large attenuation and distortion to the transceived signals.

In addition, the communication capacity of Ethernet is larger than that required in most instances. Fast Ethernet has a very large bandwidth capable of supporting a few hundred control loops. However, where PoE (Power over Ethernet) is used, it would not be possible to support this number of control loops without external or repeated power out in the field, because on long home runs the high current demand and cable copper loss would be too great, even if hybrid PoE cable was used. In a hazardous process plant the cost of such extra hardware would be quite significant, and the power supply infrastructure to support the switches and repeaters would be complex.

Therefore, the Ethernet home-run topology is not an optimal or economical solution for large-scale process plants, although perfectly adequate for the home or office environment.

Glass optical fibre can be used over long cable lengths without the need for repeaters, but glass fibre, and in particular combined fibre and power cables, can be very expensive and difficult to terminate reliably. Fibre optic cable also has to be installed very carefully, and breakages are commonplace.

The present invention is intended to overcome some of the above problems.

Therefore, according to the present invention an electrical installation comprises control and/or monitoring means connected to a field device by means of an electrical communications circuit, in which the communications circuit comprises a power supply, a communications device, the field device as a load thereof, and Intrinsic Safety means, in which the communications device is adapted to send and receive signals over the communications circuit to and from the field device, in which the field device is adapted to send and receive signals over the communications circuit to and from the communications device, in which the Intrinsic Safety means renders all or part of the communications circuit Intrinsically Safe, in which the field device is located in an Intrinsically Safe part of the communications circuit, characterised in which the communications circuit is adapted to carry DSL signals, and in which the communications device and the field device communicate with one another according to the DSL protocol.

DSL has never been used in an Intrinsically Safe environment before, as until very recently the power limits imposed by Intrinsic Safety protocols would have prevented its use. Classic Intrinsic Safety involved the limiting of power to 1.2 Watts for a gas group IIC, with which environment the present invention is primarily concerned. However the revolution in hazardous arc prevention technology has now allowed for in excess for 24 Watts to be used in Intrinsically Safe environments like gas group IIC, and thus for the use of technologies like Ethernet. However, DSL is more suitable than Ethernet for use in hazardous process plants like those described above, because it can be used on copper cables over much longer distances, and in particular it can be used on cables of up to 500 meters or more. DSL has a slower transmission speed than Ethernet and a lower communications capacity, but it could still serve the number of control loops in the type of process plants described above. In fact, its reduced capacity makes it inherently more suitable.

Furthermore, due to the reduced communications capacity, and therefore a smaller device population on a homerun, it would be possible to use powered DSL without the need for external or repeated power. This would significantly reduce installation and operation costs because of the smaller number of cable lengths, interconnecting components and protection components.

To place some perspective on this, PoE can provide approximately 12 Watts of power, and with hybrid cable systems the power can be increased to 250 Watts at 100 metres of cable. With DSL 350 Watts of power is possible with 100 meters of cable, but with 500 meters of cable the power is 100 Watts due to copper loss. This means that 240× 4-20 mA instruments can be supplied from one DSL line at 500 meters. The required bandwidth for controlling 240 analogue instruments is at least 8 Mb/s, and DSL can comfortably cope with this. As such, in the installations envisaged for this invention DSL provides a good combination of bandwidth and current consumption.

The other advantage of DSL compared to Ethernet, is that the source voltage is much higher, being up to 60 Volts. This leads to a lower voltage loss due to cable resistance, and makes powered DSL a more efficient form of power transmission, which is still safe to work with using the latest incendive arc prevention techniques.

Powered DSL could be used to power any attached device or switch, which itself could interface with field instruments using other media, for example, PoE, Fieldbus, remote I/O and so on.

Therefore, in a preferred construction the field device can comprise a router, and one or more secondary field devices can be connected to said router. The router can be adapted to convert incoming and outgoing DSL signals to and from one or more different digital or analogue communications protocols, and to communicate with each of said one or more secondary field devices according to one of said one or more different digital or analogue communications protocols. These different digital or analogue communications protocols can each comprise one of: Ethernet, Power over Ethernet (PoE), Fieldbus, Radio, 4-20 mA digital I/O, HART, RTD, T/C, Strain Gauge, Modbus or Optical.

In one embodiment the router can comprise DSL repeater means, and the communications circuit can comprise one or more secondary routers. The repeater means can be adapted to repeat incoming and outgoing DSL signals to and from the one or more secondary routers.

As referred to above, it may be preferable to use powered DSL, so in one version of the invention the communications circuit can be an imposed power circuit, and the field device can be powered by the provided imposed power. (As an alternative, or in addition to this, the field device can be provided with an external power supply.)

The Intrinsic Safety means can be any of the known devices, protocols or systems which ensure Intrinsic Safety. However, in one version of the invention the Intrinsic Safety means can be the system described in the applicant's co-pending patent application WO2006/003445.

Therefore, the Intrinsic Safety means can comprise an incendive arc prevention means comprising a monitoring means and an isolation means, in which the monitoring means is adapted to monitor the communications circuit by means of a reactor means, in which the monitoring means is adapted to recognize a reaction in the reactor means which is indicative of a short circuit with the potential to cause an incendive arc occurring in the communications circuit, in which the isolation means is adapted to fully or partially isolate the power supply from said short circuit if said reaction in the reactor means is detected by the monitoring means, such that an incendive arc cannot occur, and in which the monitoring means is adapted to recognize a reaction in the reactor means which is indicative of an event with a current and/or voltage pattern which is characteristic of a propagating non-incendive arc occurring in the communications circuit between the power supply and the field device, in which the isolation means is adapted to fully or partially isolate the power supply from said event if said reaction in the reactor means is detected by the monitoring means, such that an incendive arc cannot occur.

The applicant's co-pending patent application WO2006/003445 includes a large number of further features, and described several different embodiments. Any and all of those features and embodiments can be used with the present invention, and WO2006/003445 is included herein in its entirety by reference, to the extent that any feature disclosed therein could be incorporated into any of the Claims below during prosecution of the present application.

The Intrinsic Safety means could also be the system described in the applicant's co-pending application WO2007/129031, although this is specifically related to rendering a communication circuit Intrinsically Safe, and not necessarily a circuit with imposed power. Nevertheless, any and all of the features disclosed in that document can be used with the present invention, and WO2007/129031 is included herein in its entirety by reference, to the extent that any feature disclosed therein could be incorporated into any of the Claims below during prosecution of the present application.

In practical versions of the invention it may well prove to be better to use DSL alongside additional power circuits. Therefore, the electrical installation can further comprise an electrical power circuit comprising a power supply, the field device as a load thereof, and Intrinsic Safety means which can render all or part of the power circuit Intrinsically Safe. The field device can be located in an Intrinsically Safe part of the power circuit, and it can be partially or fully powered by the power circuit.

The communications circuit and the power circuit can comprise wires which are bundled together in the same cable.

The power circuit can comprise a single pairing of wires, and where that is the case the incendive arc prevention means disclosed in WO2006/003445, and referred to above, can constitute the Intrinsic Safety means.

Therefore, the Intrinsic Safety means of the power circuit can comprise an incendive arc prevention means comprising a monitoring means and an isolation means, in which the monitoring means is adapted to monitor the power circuit by means of a reactor means, in which the monitoring means is adapted to recognize a reaction in the reactor means which is indicative of a short circuit with the potential to cause an incendive arc occurring in the power circuit, in which the isolation means is adapted to fully or partially isolate the power supply thereof from said short circuit if said reaction in the reactor means is detected by the monitoring means, such that an incendive arc cannot occur, and in which the monitoring means is adapted to recognize a reaction in the reactor means which is indicative of an event with a current and/or voltage pattern which is characteristic of a propagating non-incendive arc occurring in the power circuit between the power supply thereof and the field device, in which the isolation means is adapted to fully or partially isolate the power supply thereof from said event if said reaction in the reactor means is detected by the monitoring means, such that an incendive arc cannot occur.

Again, any and all of the features disclosed in WO2006/003445 can be used with the power circuit and WO2006/003445 is referred to, to the extent that any feature disclosed therein could be incorporated into any of the Claims below relating to the power circuit during prosecution of the present application.

However, in an alternative to the above the power circuit can comprise two pairs of wires, like that used in Ethernet. Where that is the case the incendive arc prevention means disclosed in WO2007/088387 in the name of the applicant can be used as the Intrinsic Safety means instead.

Therefore, the power circuit can comprise a pair of parallel positive cables between the power supply thereof and the field device and a pair of parallel negative cables between the field device and the power supply thereof, and the Intrinsic Safety means can comprise incendive arc prevention means comprising monitoring means adapted to monitor the pair of positive cables and the pair of negative cables, and to detect if the current and/or voltage in one of the pair of positive cables deviates from the other, and if the current and/or voltage in one of the pair of negative cables deviates from the other, and in which the incendive arc prevention means comprises a control means adapted to fully or partially isolate the power supply thereof from the pair of positive cables and the pair of negative cables if the monitoring means detects that the current and/or voltage of one of the pair of positive cables has deviated from the other, or if the current and/or voltage of one of the pair of negative cables has deviated from the other.

Once more, any and all of the features and embodiments disclosed in WO2007/088387 can be used with the present invention, and WO2007/088387 is included herein in its entirety by reference, to the extent that any feature disclosed therein could be incorporated into any of the Claims below during prosecution of the present application.

The communications circuit can also comprise a pair of positive cables and a pair of negative cables if desired. Such an arrangement allows for twice the communications speed.

Whether single or paired cables are used, if all the field instruments formed a control loop pair, then the upload and download rates could be symmetrical, and the DSL can be SDSL. Alternatively, if the upload and download rates do not need to be symmetrical the DSL could can be ADSL.

The electrical installation can comprise a redundant electrical communications circuit identical to the electrical communications circuit.

The communications circuit can also comprise one or more repeater units, which are simply adapted to repeat incoming and outgoing DSL signals. These may be required in practice if the cable lengths are high.

Several embodiments of the invention will now be described by way of example, and with reference to the accompanying drawings, in which.

Figure 1:
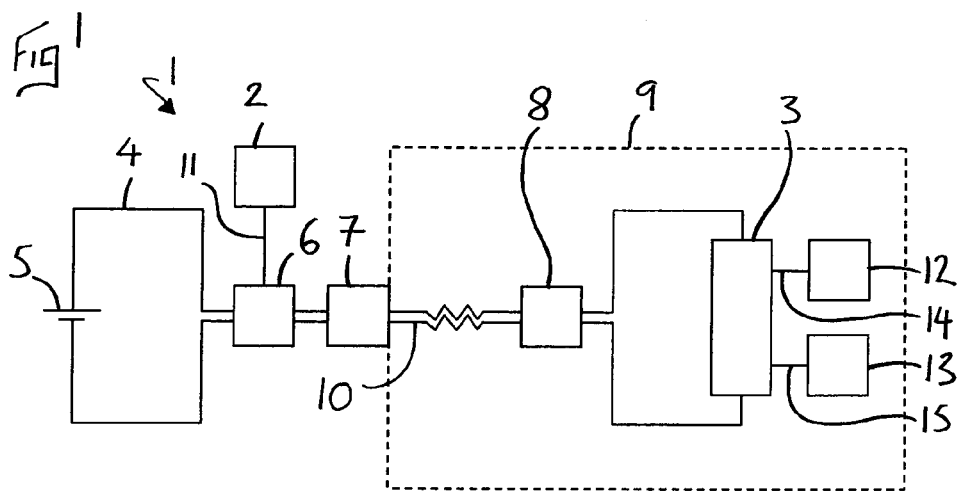
FIG. 1 is a diagrammatic view of an electrical installation according to the present invention.

As shown in FIG. 1 an electrical installation 1 comprises control and/or monitoring means, in the form of PC 2, connected to a field device, in the form of router 3, by means of an electrical communications circuit 4. The communications circuit 4 comprises a power supply 5, a communications device, in the form of router 6, the router 3 as a load thereof, and Intrinsic Safety means, in the form of incendive arc monitoring and prevention modules 7 and 8 at either end of the circuit 4.

As described further below the router 6 is adapted to send and receive signals over the communications circuit 4 to and from the router 3, and visa versa. The Intrinsic Safety means 7 and 8 renders part 9 of the communications circuit 4 Intrinsically Safe, and the router 3 is located in the Intrinsically Safe part 9. The communications circuit 4 is adapted to carry DSL signals, and the routers 3 and 6 communicate with one another according to the DSL protocol.

FIG. 1 shows the present invention in its most basic form and is merely intended to illustrate the essential features of the invention. It will be appreciated that various other components will be required in practice, and that it may be preferred to implement a far more complex set up.

However, referring to FIG. 1, the communications circuit 4 is an imposed power circuit and the power provided by the power supply 5 powers the router 3. A cable section 10 extends into the Intrinsically Safe part 9 of the circuit 4, and is several hundred meters in length. The cable section 10 is copper wire adapted to carry DSL signals and power.

The PC 2 is connected to the router 6 by means of an Ethernet cable 11, and the two components communicate with one another according to the Ethernet protocol. The router 6 is adapted to convert the incoming Ethernet signals into DSL signals, and to transmit those DSL signals down the circuit 4.

The router 3 is connected to two field instruments 12 and 13 by Ethernet cable 14 and Fieldbus connection 15 respectively, and the router 3 communicates with these components according to those particular protocols. This configuration is merely illustrative of what is possible, and it will be appreciated that any number of field instruments can be connected to the router 3, and by any known type of communications media.

The incendive arc prevention modules 7 and 8 comprise monitoring means and isolation means like those described in WO2006/003445 referred to above. These features are explained in full in that document, and are not described any further herein.

Figure 2:
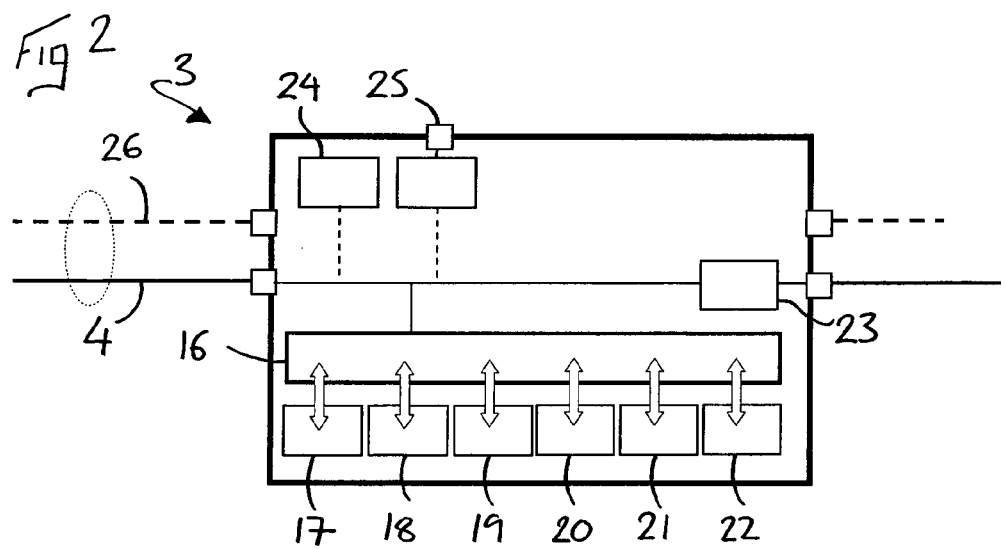
FIG. 2 is a diagrammatic view of a field device used in the electrical installation shown in FIG. 1.

FIG. 2 illustrates the router 3 in more detail, and it also shows a number of further features which are not shown in FIG. 1. The purpose of the router 3 is to provide an adequate DSL backbone to standardised field devices and device interfaces. The router 3 comprises a control unit 16 which manages the communications I/O, processing, memory and power management. Connected to the control unit 16 are six outlets, which each have different functions. Outlet 17 is a PoE switch or spur, outlet 18 is a Fieldbus outlet for a segment or a device, outlet 19 is a radio link, outlet 20 is a classic digital RTD I/O, outlet 21 is another digital interface, for example Modbus, and outlet 22 is an auxiliary device power supply. The control unit 16 converts the incoming DSL signals into the appropriate form for each outlet 17 to 21, and visa versa, and diverts power from the circuit 4 to the auxiliary power supply 22.

It will be appreciated that outlets 17 to 22 are merely illustrative of what is possible, and further or fewer of these outlets can be provided, or multiple types of a particular outlet can be provided, so the router 3 can be configured however is required by the demands on any particular site. Other types of digital or analogue communication outlets are also possible, including simple Ethernet, 4-20 mA digital I/O, HART, T/C, Strain Gauge or Optical.

The router 3 also comprises a DSL repeater 23, so a plurality of such routers 3 can be configured in series in the circuit 4. The router 3 further comprises a filter 24 for handset connection, and an inlet 25 for an external power supply. Again, these features are optional and can be incorporated if required.

The router 3 is shown in FIG. 2 as being connected to circuit 4, and a redundant communications circuit 26. This arrangement provides security in the event of a fault, and again is optional. In practice a simplex approach would not be satisfactory for use in industrial environments where accuracy and reliability are important, and the architecture should include redundancy or a voting system. A voting system is an extremely good error detecting system as well as achieving high integrity. The external power provided can also be simplex or redundant.

Figure 3:
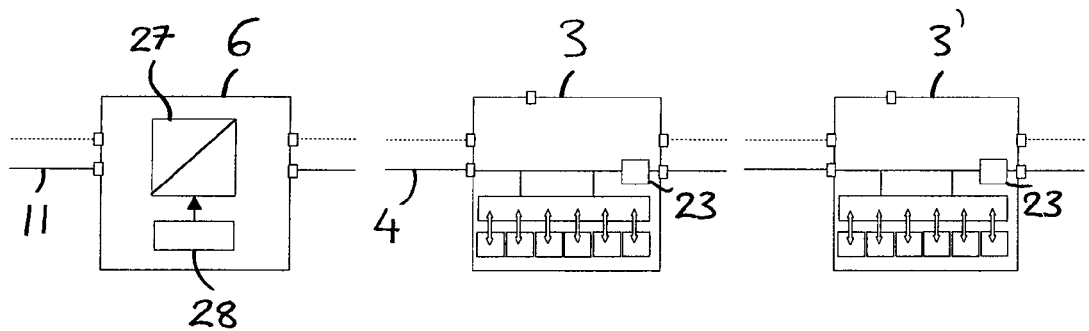
FIG. 3 is a diagrammatic view of a communications device and field devices as used in an electrical installation according to the present invention.

FIG. 3 shows the router 6 in more detail, and illustrates how a plurality of the field routers 3, 3' can be connected in series in the circuit 4, by means of DSL repeaters 23. The router 6 is connected to the PC 2 by Ethernet cable 11, which is shown as having a redundancy. This connection to the PC 2 can also be PoE, Profinet or any other serial or parallel interface. The router 6 comprises a converter function 27 which converts the incoming Ethernet signals into DSL signals for transmittal over the circuit 4. The router 6 also has an optional power injector which can comprise, or operate in conjunction with, the imposed power from the power source 5.

Figure 4:
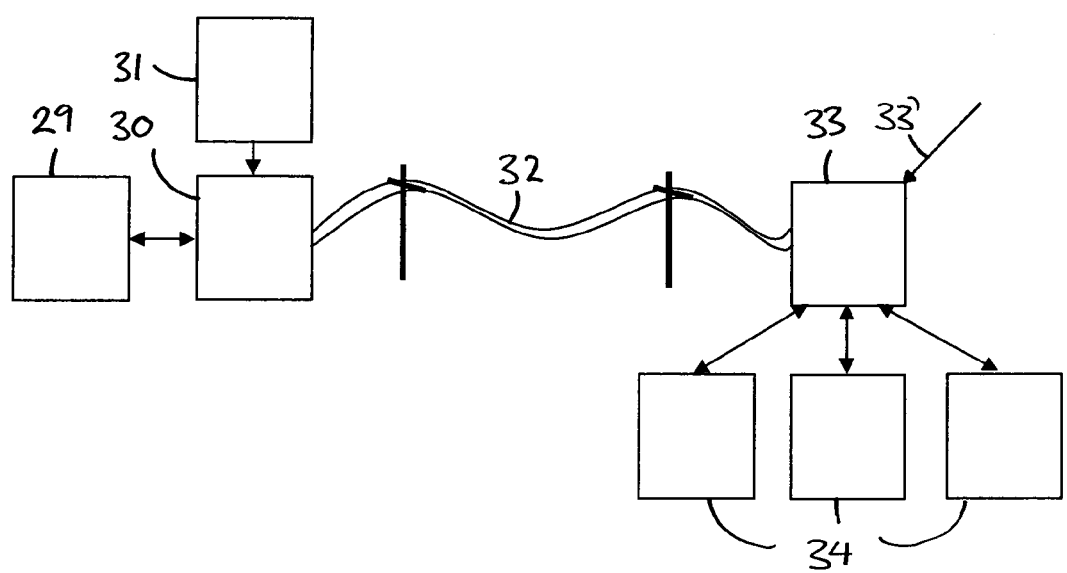
FIG. 4 is a diagrammatic view of an electrical installation according to the present invention.

FIG. 4 is a simple block diagram which conforms to the electrical installation 1 shown in FIG. 1. In FIG. 4, an Ethernet interface 29 connects to a router 30, which is provided with power 31. A DSL cable 33 extends like a telephone line over some distance to field router 33, which connects wirelessly or in a wired fashion to field instruments 34. The field router 33 can be provided with an optional power input 33', which can provide power for the router 33 and for the field instruments 34.

Figure 5:
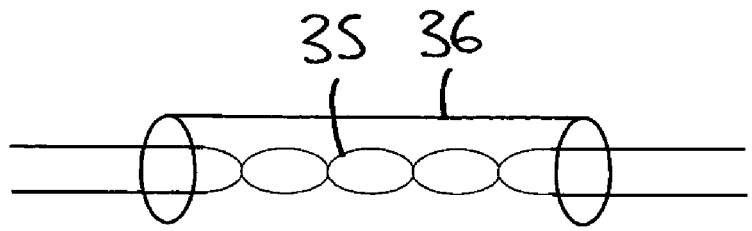
FIG. 5 is a diagrammatic view of a cable as used in an electrical installation according to the present invention.
Figure 6:
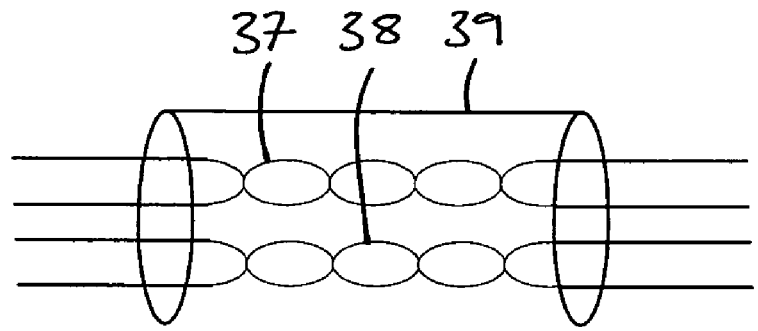
FIG. 6 is a diagrammatic view of a cable as used in an electrical installation according to the present invention.
Figure 7:
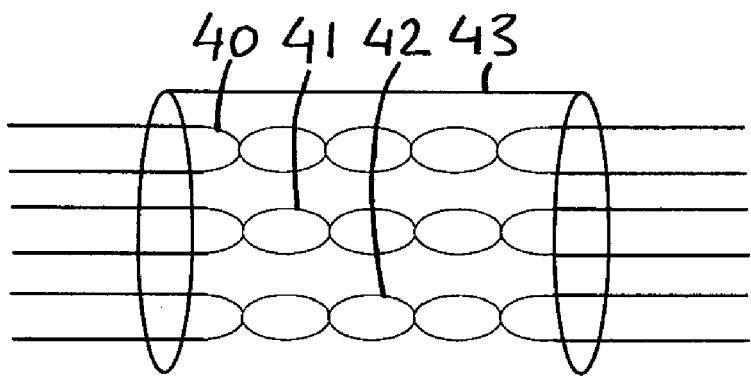
FIG. 7 is a diagrammatic view of a cable as used in an electrical installation according to the present invention.

As referred to above, in practice it may be better to use DSL alongside additional power circuits, and FIGS. 5 to 7 illustrate the various possibilities.

In FIG. 5 a single pair of twisted cores 35 are used inside the cable 36, and they carry the DSL signals with or without imposed power. If no imposed power is provided, then external power is provided to the field device. This is the same arrangement as shown in FIG. 1.

However, in FIG. 6 two pairs of twisted cores 37 and 38 are used inside the cable 39. In this case the first pair 37 carry the DSL signals with or without imposed power, and the second pair 38 provide power. This arrangement is similar to an Ethernet cable, which uses a mixture of small and large c.s.a. cores.

Provided the characteristic impedance of the cores 37 are within the DSL specification, then any known type of single pair, or multiple pair cable, could be used as shown in FIG. 6 to put the invention into effect. Such an arrangement would be more beneficial for process plant environments where multi-core pairs are commonplace and cost effective. The cores 38 can be large gauge, which would make them superior to cat 5e Ethernet cables, and termination/connection would be better than RJ45 type connectors.

With this construction the cores 38 can be part of a power circuit provided with Intrinsic Safety means the same as incendive arc monitoring and prevention modules 7 and 8 shown in FIG. 1. In other Words, the power circuit can incorporate the Intrinsic Safety invention disclosed in WO2006/003445.

FIG. 7 shows an alternative arrangement in which a first pair of twisted cores 40 carry the DSL signals with or without imposed power, and the power circuit comprises two pairs of twisted cores 41 and 42, which is so-called 4 wire power. All three pairs 40, 41 and 42 are bundled together inside the cable 43.

The cores 41 comprise a pair of parallel positive cores and the cores 42 comprise a pair of parallel negative cores. With this construction the cores 41 and 42 can be part of a power circuit provided with Intrinsic Safety means like that disclosed in WO2007/088387.

Figure 8:
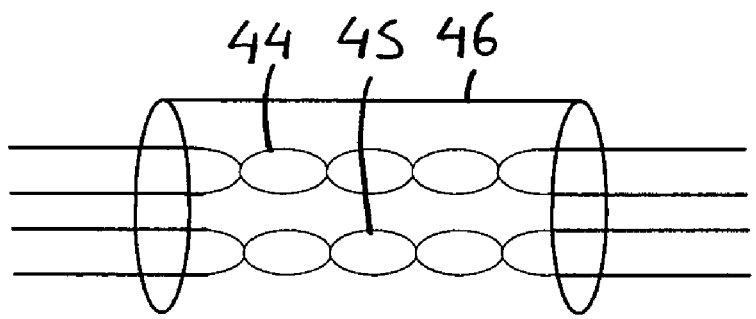
FIG. 8 is a diagrammatic view of a cable as used in an electrical installation according to the present invention.

FIG. 8 illustrates a further possibility, in which the communications circuit of the present invention comprises a 4 wire arrangement. A first pair of twisted cores 44 can comprise an upload DSL pair, while a second pair of twisted cores 45 can comprise a download DSL pair. Such an arrangement allows for twice the communications speed, and indeed for SDSL where the upload and download capacities are the same.

It will be appreciated that a 4 wire communications circuit could also be used alongside a 2 wire or 4 wire power circuit as shown in FIGS. 6 and 7.

In terms of the particular type of DSL which is used with any of the above mentioned embodiments of the invention, this can be basic DSL, SDSL as referred to above, or ADSL if preferred. It could also be ADSL2 or any other variant, as required.

Figure 9:
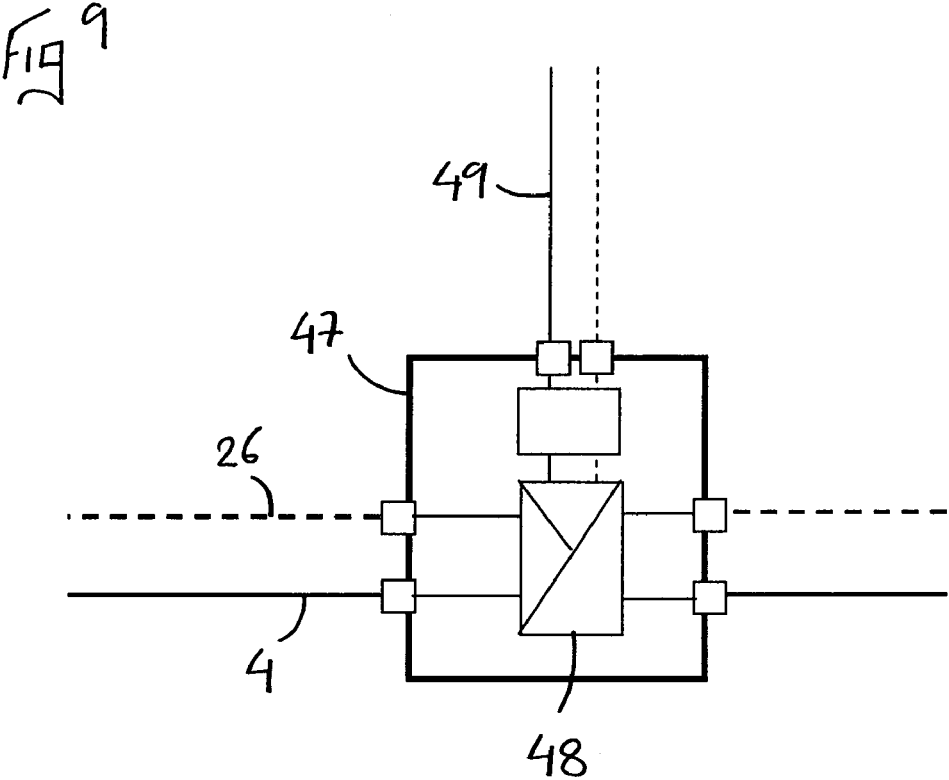
FIG. 9 is a diagrammatic view of a DSL repeater as used in an electrical installation according to the present invention.

FIG. 9 shows a repeater, which can also operate as a power injector, a hub, or an isolator, and which can be used in the circuit 4 to increase its capacity. The repeater 47 is mounted in the circuit 4, and the redundant circuit 26, and comprises a repeater function 48. The repeater 47 is shown as being provided with simplex or redundant external power 49, which is optional. The option of isolation also provides a system alternative to parallel redundancy in the form of ring or loop redundancy (not shown), where any short circuit or open circuit on any side will be isolated from the mirrored side.

Figure 10:
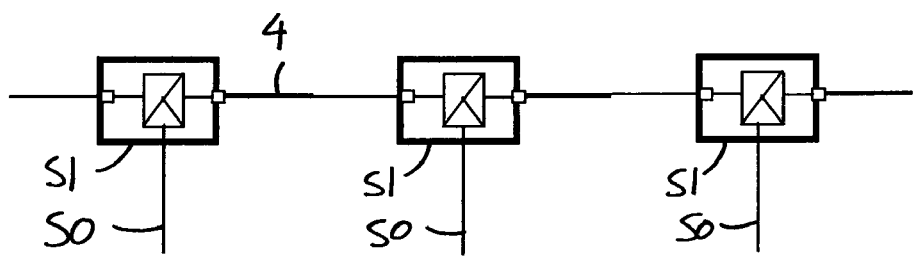
FIG. 10 is a diagrammatic view of an arrangement of spur isolators as used in an electrical installation according to the present invention.

FIG. 10 illustrates how the DSL communications circuit 4 can be a backbone which is multi-dropped for increased network reach and economy. A number of DSL spurs 50 can extend from input to output isolator spurs 51 mounted in the circuit 4. With isolation, the integrity of the home run can be maintained during any cable or device fault.

Therefore, the present invention provides broadband in an Intrinsically Safe environment, which overcomes the problems associated with using very long lengths of Intrinsically Safe Ethernet cable.

The invention claimed is:

1. An electrical installation comprising control and/or monitoring means connected to a field device by means of an electrical communications circuit, in which the communications circuit comprises a power supply, a communications device, the field device as a load thereof, and an active incendive arc prevention means, in which the communications device is adapted to send and receive signals over the communications circuit to and from the field device, in which the field device is adapted to send and receive signals over the communications circuit to and from the communications device, in which the communications circuit operates at above a 1.2 Watts Intrinsic Safety power limit and is rendered Intrinsically Safe by the active incendive arc prevention means, in which the communications circuit is an imposed power circuit, in which the field device is located in an Intrinsically Safe part of the communications circuit and is powered by the provided imposed power, in which the communications circuit is adapted to carry DSL signals in said Intrinsically Safe part thereof, and in which the communications device and the field device communicate with one another according to the DSL protocol.

2. An electrical installation as claimed in claim 1 in which the field device comprises a router, in which one or more secondary field devices are connected to said router, in which the router is adapted to convert incoming and outgoing DSL signals to and from one or more different digital or analogue communications protocols, and to communicate with each of said one or more secondary field devices according to one of said one or more different digital or analogue communications protocols.

3. An electrical installation as claimed in claim 2 in which the one or more different digital or analogue communications protocols each comprise one of: Ethernet, Power over Ethernet (PoE), Fieldbus, Radio, 4-20 mA digital I/O, HART, RTD, T/C, Strain Gauge, Modbus or Optical.

4. An electrical installation as claimed in claim 3 in which the router comprises DSL repeater means, in which the communications circuit comprises one or more secondary routers, and in which the repeater means is adapted to repeat incoming and outgoing DSL signals to and from the one or more secondary routers.

5. An electrical installation as claimed in claim 1, in which the incendive arc prevention means comprises a monitoring means and an isolation means, in which the monitoring means is adapted to monitor the communications circuit by means of a reactor means, in which the monitoring means is adapted to recognize a reaction in the reactor means which is indicative of a short circuit with the potential to cause an incendive arc occurring in the communications circuit, in which the isolation means is adapted to fully or partially isolate the power supply from said short circuit if said reaction in the reactor means is detected by the monitoring means, such that an incendive arc cannot occur, and in which the monitoring means is adapted to recognize a reaction in the reactor means which is indicative of an event with a current and/or voltage pattern which is characteristic of a propagating non-incendive arc occurring in the communications circuit between the power supply and the field device, in which the isolation means is adapted to fully or partially isolate the power supply from said event if said reaction in the reactor means is detected by the monitoring means, such that an incendive arc cannot occur.

6. An electrical installation as claimed in claim 1 in which the communications circuit comprises a pair of positive cables and a pair of negative cables.

7. An electrical installation as claimed in claim 1 in which the DSL is SDSL.

8. An electrical installation as claimed in claim 1 in which the DSL is ADSL.

9. An electrical installation as claimed in claim 1 in which the field device is provided with an external power supply.

10. An electrical installation as claimed in claim 1 in which the electrical installation comprises a redundant electrical communications circuit identical to the electrical communications circuit.

11. An electrical installation as claimed in claim 1 in which the communications circuit comprises one or more repeater units adapted to repeat incoming and outgoing DSL signals.

12. An electrical installation comprising control and/or monitoring means connected to a field device by means of an electrical communications circuit, in which the communications circuit comprises a power supply, a communications device, the field device as a load thereof, and Intrinsic Safety means, in which the communication device is adapted to send and receive signals over the communications circuit to and from the field device, in which the field device is adapted to send and receive signals over the communications circuit to and from the communications device, in which the Intrinsic Safety means renders all or part of the communications circuit Intrinsically Safe, in which the field device is located in an Intrinsically Safe part of the communications circuit, in which the communications circuit is adapted to carry DSL signals in said Intrinsically Safe part thereof, and in which the communications device and the field device communicate with one another according to the DSL protocol, in which the electrical installation further comprises an electrical power circuit comprising a power supply, the field device as a load thereof, and an active incendive arc prevention means, in which the power circuit operates at above a 1.2 Watts Intrinsic Safety power limit and is rendered Intrinsically Safe by the active incendive arc prevention means, in which the field device is located in an Intrinsically Safe part of the power circuit, and in which the field device is partially or fully powered by the power circuit, and in which the communications circuit and the power circuit comprise wires which are bundled together in the same cable.

13. An electrical installation as claimed in claim 12 in which the power circuit comprises a single pairing of wires, and in which the Intrinsic Safety means of the power circuit comprises an incendive arc prevention means comprising a monitoring means and an isolation means, in which the monitoring means is adapted to monitor the power circuit by means of a reactor means, in which the monitoring means is adapted to recognize a reaction in the reactor means which is indicative of a short circuit with the potential to cause an incendive arc occurring in the power circuit, in which the isolation means is adapted to fully or partially isolate the power supply thereof from said short circuit if said reaction in the reactor means is detected by the monitoring means, such that an incendive arc cannot occur, and in which the monitoring means is adapted to recognize a reaction in the reactor means which is indicative of an event with a current and/or voltage pattern which is characteristic of a propagating non-incendive arc occurring in the power circuit between the power supply thereof and the field device, in which the isolation means is adapted to fully or partially isolate the power supply thereof from said event if said reaction in the reactor means is detected by the monitoring means, such that an incendive arc cannot occur.

14. An electrical installation as claimed in claim 12 in which the power circuit comprises a pair of parallel positive cables between the power supply thereof and the field device and a pair of parallel negative cables between the field device and the power supply thereof, in which the Intrinsic Safety means comprises incendive arc prevention means comprising monitoring means adapted to monitor the pair of positive cables and the pair of negative cables, and to detect if the current and/or voltage in one of the pair of positive cables deviates from the other, and if the current and/or voltage in one of the pair of negative cables deviates from the other, and in which the incendive arc prevention means comprises a control means adapted to fully or partially isolate the power supply thereof from the pair of positive cables and the pair of negative cables if the monitoring means detects that the current and/or voltage of one of the pair of positive cables has deviated from the other, or if the current and/or voltage of one of the pair of negative cables has deviated from the other.

* * * * *